No. 675,875. Patented June 4, 1901.
F. ULLMER.
MICROMETER.
(Application filed May 14, 1900.)
(No Model.) 2 Sheets—Sheet 1.
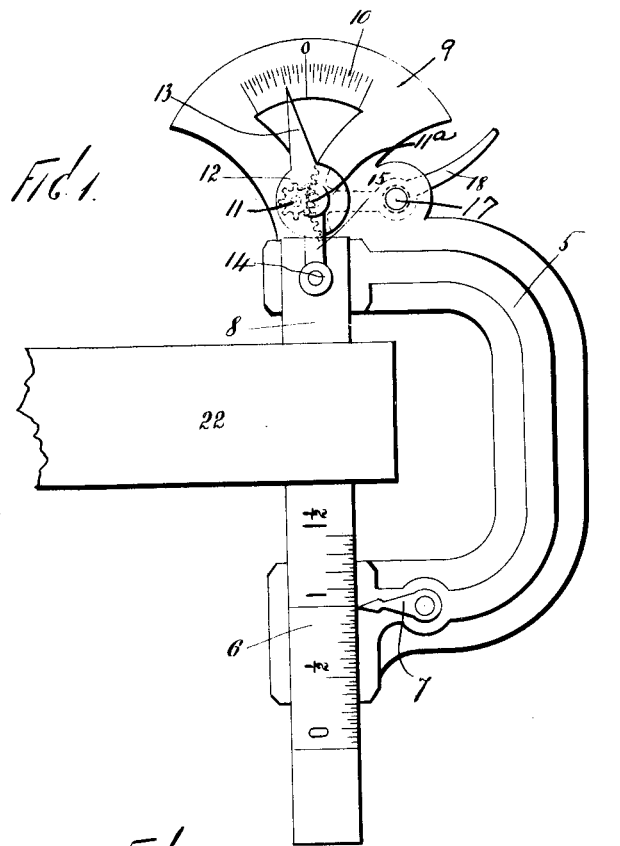
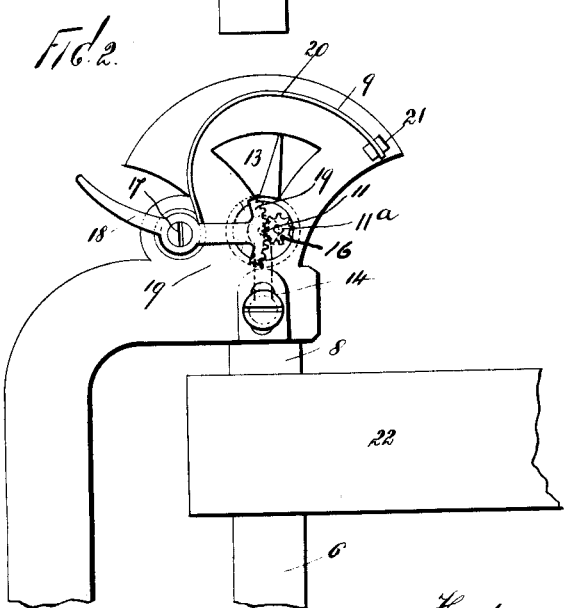
WITNESSES
INVENTOR
Frederic Ullmer
BY
Edgar Tate & Co
ATTORNEYS No. 675,875. Patented June 4, 1901.
F. ULLMER.
MICROMETER.
(Application filed May 14, 1900.)
(No Model.)
2 Sheets—Sheet 2.
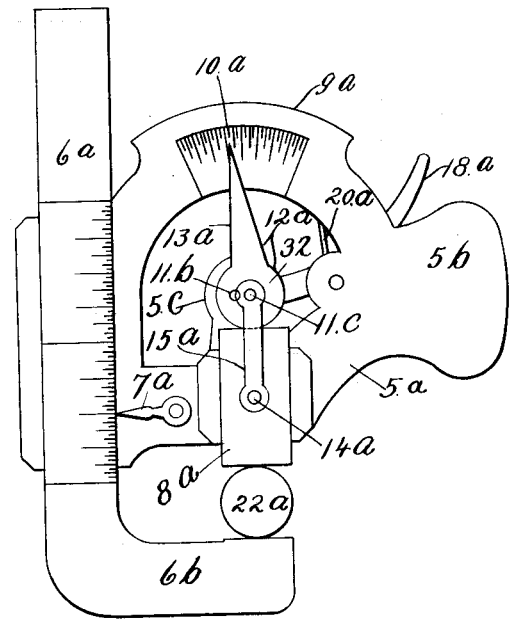
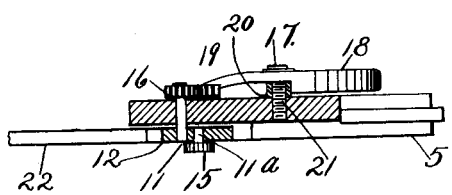
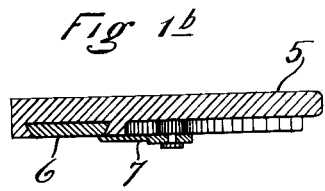
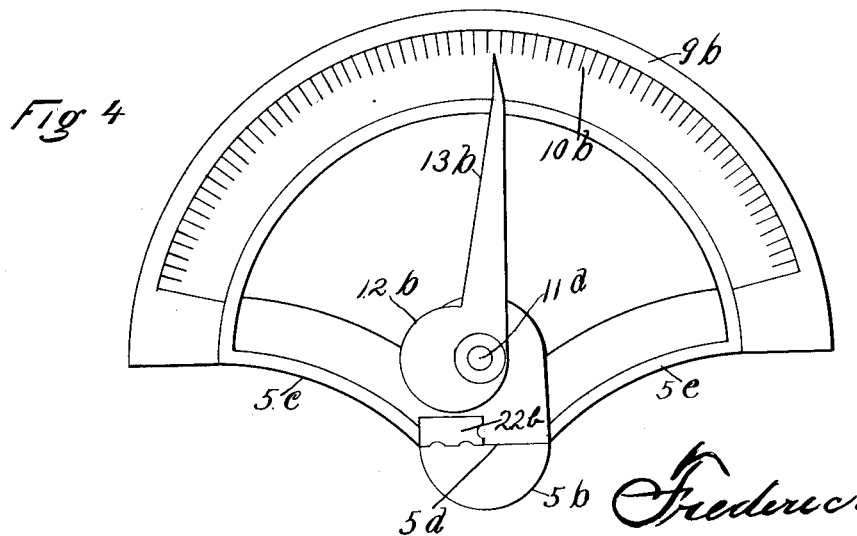
WITNESSES
Paul C. Hoon.
Frederic Ullmer
INVENTOR
BY Edgar Tate & Co
ATTORNEYS

UNITED STATES PATENT OFFICE.

FREDERIC ULLMER, OF LONDON, ENGLAND.

MICROMETER.

SPECIFICATION forming part of Letters Patent No. 675,875, dated June 4, 1901.

Application filed May 14, 1900. Serial No. 16,591. (No model.)

*To all whom it may concern:*

Be it known that I, FREDERIC ULLMER, a subject of the Queen of Great Britain, residing at London, county of Middlesex, England, have invented certain new and useful Improvements in Micrometers, of which the following is a full and complete specification, such as will enable those skilled in the art to which it appertains to make and use the same.

This invention relates to micrometers; and the object thereof is to provide a micrometer whereby extremely fine measurements of the dimensions of bodies may be easily and accurately made by the employment of a scale upon which variations from predetermined dimensions are magnified, being denoted by a movable pointer element.

The invention consists in the construction and arrangement of parts hereinafter specified.

In the accompanying drawings, forming part of this specification, in which like reference characters denote like parts in the several views, Figure 1 is a front view of a micrometer constructed according to my invention, showing an object in position to be measured thereby. Figs. 1$^a$ and 1$^b$ are sectional details of the construction shown in Fig. 1 looking downward; Fig. 2, a rear view of a portion of Fig. 1; Fig. 3, a front view of a modified form of construction, and Fig. 4 a front view of a still further modified form of construction.

In the practice of my invention, reference being made to Figs. 1 and 2, I provide a micrometer-body 5, which may be readily grasped to support the instrument and which is provided at one end with a slidably-mounted scale-bar 6, in connection with which operates a pointer 7, fixed to the micrometer-body 5 adjacent said scale-bar.

Slidably mounted in the end of the body portion 5, directly opposite the scale-bar 6 at the longitudinal plane thereof, is a gripper-jaw 8. A segmental scale-disk 9 is connected with the body portion 5 at the end thereof in which the gripper-jaw 8 is mounted and is provided with a scale 10, the graduations of which represent exceedingly diminutive variations in bulk of the object to be measured, as hereinafter described. If it is desired to measure upon the scale 10 variations in bulk of, say, one-thousandth of an inch, the spaces between the graduations of the scale 10 are read as thousandths of an inch, though in forming the scale 10 they may really be included between graduations a sixteenth of an inch or more apart, as will be readily understood.

Passed through the lower part of the scale-disk 9 is a rotatable spindle 11, and fixed eccentrically upon one end thereof is a circular pointer-body 12, provided with a pointer 13, which operates in connection with the graduations of the scale 10. The pointer-body 12 is provided with a projecting stud 11$^a$, arranged centrally thereof, and the gripper-jaw 8 is provided with a projecting stud 14, and said studs 11$^a$ and 14 are connected by means of a link 15, whereby the pointer-body 12 is free to rotate eccentrically with the spindle 11, and thus reciprocate the gripper-jaw 8. The spindle 11 is shown in Figs. 1 and 2 and, as shown in Fig. 2, is provided at the side of the instrument opposite that at which the studs 11$^a$ and 14 are arranged with a pinion 16, and pivoted to the instrument-body at 17, adjacent said pinion, is a thumb-lever 18, provided with a segmental gear-head 19, which operates in connection with the pinion 16 and which is normally depressed by means of a plate-spring 20, which is fixed to the rear of the scale-disk 9 at 21.

At 22 is shown a block or other body the transverse dimension of which is presumed to be one inch, as shown upon the scale of the scale-bar 6 by the pointer 7, which operates in connection therewith. In inserting the object 22 between the gripper-jaw 8 and the scale-bar 6 the former is raised by means of the thumb-lever 18 against the tension of the spring 20, the gripper-jaw 8 being operatively connected with the pointer-body 12 by the link 15, as above described. After the object 22 has been thus inserted the thumb-lever 18 is released and the pointer 13 assumes a certain position relative to the graduations of the scale 10, which position is caused by the variation in bulk of the object 22 from the dimensions indicated by the scale upon the scale-bar 6. As the pointer-body 12 is eccentrically mounted upon the spindle 11, the pointer 13 assumes its final position above described at either one side or the other of the zero-graduation of the scale 10, according to the bulk of the article 22, the plate-spring 20 maintaining the pointer 13 in such position. It is manifest that an exceedingly-slight actuation of the pointer-body 12 at its point of contact with the gripper-jaw 8 will cause a greatly-increased actuation of the extreme end of the pointer 13 and that if such initial actuation of the pointer-body 12 causes the same to move at the point of contact with the gripper-jaw 8 through a distance of, say, five one-thousanths of an inch the extreme end of the pointer 13 will register with the fifth graduations of the scale 10 at that side of the zero-graduations thereof as predetermined by the excess or the contrary of dimension of the object 22 as over or under the dimension thereof indicated by the pointer 7 upon the scale-bar 6.

In Fig. 1ª I have shown a transverse section of Fig. 1 taken through the center of the pointer-body 12, and in Fig. 1ᵇ I have shown another transverse section taken through the pointer 7, and by means of these views the details of the construction shown in Figs. 1 and 2 will be clearly understood.

In Fig. 3 is shown a micrometer particularly adapted for measuring work which is being reduced in dimensions in a turning-lathe. In the body portion 5ª of the micrometer shown in this figure is slidably mounted a scale-bar 6ª, provided with an angularly-directed end portion 6ᵇ, which is brought to bear upon the object 22ª to be measured. The pointer 7ª is fixed to the body portion 5ª and operates in connection with a scale upon the scale-bar 6ª. The body portion 5ª is also provided on one side with a knob or handle 5ᵇ, whereby the device may be readily supported and handled, and said body portion is likewise provided at the upper part thereof with a segmental scale-bar 9ª, upon which is arranged a scale 10ª, the graduations of which we may assume are the same as in Figs. 1 and 2 and designed to represent thousandths of an inch. The body portion 5ª is provided with a central head or projection 5ᶜ, which projects into a position beneath the scale-bar 9ª, and mounted therein is a spindle 11ᵇ, to which is eccentrically secured a circular pointer-body 12ª, provided with a pointer 13ª, which operates in connection with the scale 10ª. Slidably mounted in the body portion 5ª, beneath the pointer-body 12ª, is a gripper-jaw 8ª, provided with a projecting stud or pin 14ª, and a link 15ª operatively connects the stud or pin 14ª with a projecting stud or pin 11ᶜ, arranged centrally of the pointer-body 12ª. I also provide in this construction a thumb-lever 18ª, similar to the thumb-lever 18 in Figs. 1 and 2, which operates in connection with the rear end of the spindle 11ᵇ in the same manner as the corresponding parts coöperate in Figs. 1 and 2 of the drawings, said thumb-lever 18ª being normally depressed by means of a plate-spring 20ª, similar to the spring 20 in Figs. 1 and 2.

In this form of construction the object 22ª to be measured is brought to bear upon the angular end portion 6ᵇ of the scale-bar 6ª and beneath the gripper-jaw 8ª by raising said gripper-jaw by means of the thumb-lever 18ª and then allowing the spring 20ª to depress said thumb-lever and bring the gripper-jaw 8ª to bear directly upon the object 22ª, thus indicating upon the scale 10ª the variation in dimension of the object 22ª from the dimensions denoted by the scale upon the scale-bar 6ª in the same manner as hereinbefore described in connection with the construction shown in Figs. 1 and 2 of the drawings.

In Fig. 4 I have shown a form of micrometer particularly adapted for measuring the dimensions of type-bodies as well as other objects, one of which type-bodies is shown at 22ᵇ. The body portion 5ᵇ in this form of construction is provided with a pair of oppositely-directed arms 5ᶜ, with the ends of which is connected the segmental scale-bar 9ᵇ. The graduations of the scale 10ᵇ on the scale-bar 9ᵇ represents extremely-minute measurements, the same as in Figs. 1 and 3, and the body portion 5ᵇ is provided with a projecting ledge 5ᵈ, upon which the type-body 22ᵇ is placed for measurement, and passed through said body portion 5ᵇ is a turnable spindle 11ᵈ, to which is fixed eccentrically a pointer-body 12ᵇ, which is provided with a pointer 13ᵇ. The pointer-body 12ᵇ is approximately circular in form, whereby when it is engaged with the type-body 22ᵇ it is caused to determine the position of the pointer 13ᵇ with relation to the scale 10ᵇ, thus denoting upon the said scale the dimensions of the type-body. It will be understood that in Fig. 4 the pointer-body is engaged directly by the object to be measured, thus disposing with the sliding gripping-jaw shown in the other figures.

I do not limit myself to the specific construction and arrangement of parts herein specified, but reserve the right to vary the same within the scope of my invention.

Having fully described my invention, I claim as new and desire to secure by Letters Patent—

1. A micrometer, embodying a body portion, a scale-bar slidably mounted therein, said body portion being provided with a scale-disk, and a turnable spindle, a pointer-body eccentrically fixed to said spindle and provided with a pointer which operates in connection with said scale-disk, a gripper-jaw slidably mounted in said body portion and operatively connected with said pointer-body centrally thereof, said spindle being provided with a pinion, and a thumb-lever provided with a gear-head which operates in connection with said pinion, substantially as shown and described.

2. A micrometer, embodying a body portion, a scale-bar slidably mounted therein, said body portion being provided with a scale-disk, and a turnable spindle, a cam pointer-body eccentrically fixed to said spindle and provided with a pointer which operates in connection with said scale-disk, a gripper-jaw slidably mounted in said body portion and operatively connected with said pointer-body centrally thereof, said spindle being provided with a pinion, and a spring-actuated thumb-lever provided with a gear-head which operates in connection with said pinion, substantially as shown and described.

In testimony that I claim the foregoing as my invention I have signed my name, in presence of the subscribing witnesses, this 26th day of April, 1900.

FREDERIC ULLMER.

Witnesses:
GEORGE FREDERICK WARREN,
WALTER JAMES SKERTEN.